Dec. 17, 1957  J. H. WALSH  2,816,420
HYDRAULIC SYSTEM
Filed April 12, 1956

Inventor
Joseph H. Walsh,
by George H. Baldwin
His Attorney.

United States Patent Office 2,816,420
Patented Dec. 17, 1957

2,816,420

HYDRAULIC SYSTEM

Joseph H. Walsh, Mandarin, Fla.

Application April 12, 1956, Serial No. 577,701

10 Claims. (Cl. 60—52)

This invention relates to hydraulic mechanisms, and is particularly directed to an improved control system for applying hydraulic fluid under pressure to an hydraulic motor, such as the actuating cylinder of a vehicle steering device.

A general object of the invention is to provide an improved hydraulic system particularly adapted for use as a steering mechanism for a vehicle.

A more specific object of the invention is to provide a novel hydraulic linkage between the steering wheel of a vehicle and the hydraulic cylinder which contains a piston coupled to the steering arm of the vehicle.

This invention contemplates the provision of a source of hydraulic pressure fluid coupled through a control valve to a force-applying hydraulic motor, and particularly pertains to the structure of a control valve operable in response to hydraulic pressure derived from a reversible pump, the pump being directly connected to and operable by a vehicle steering wheel or the like.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which:

Figures 1, 2, 3:
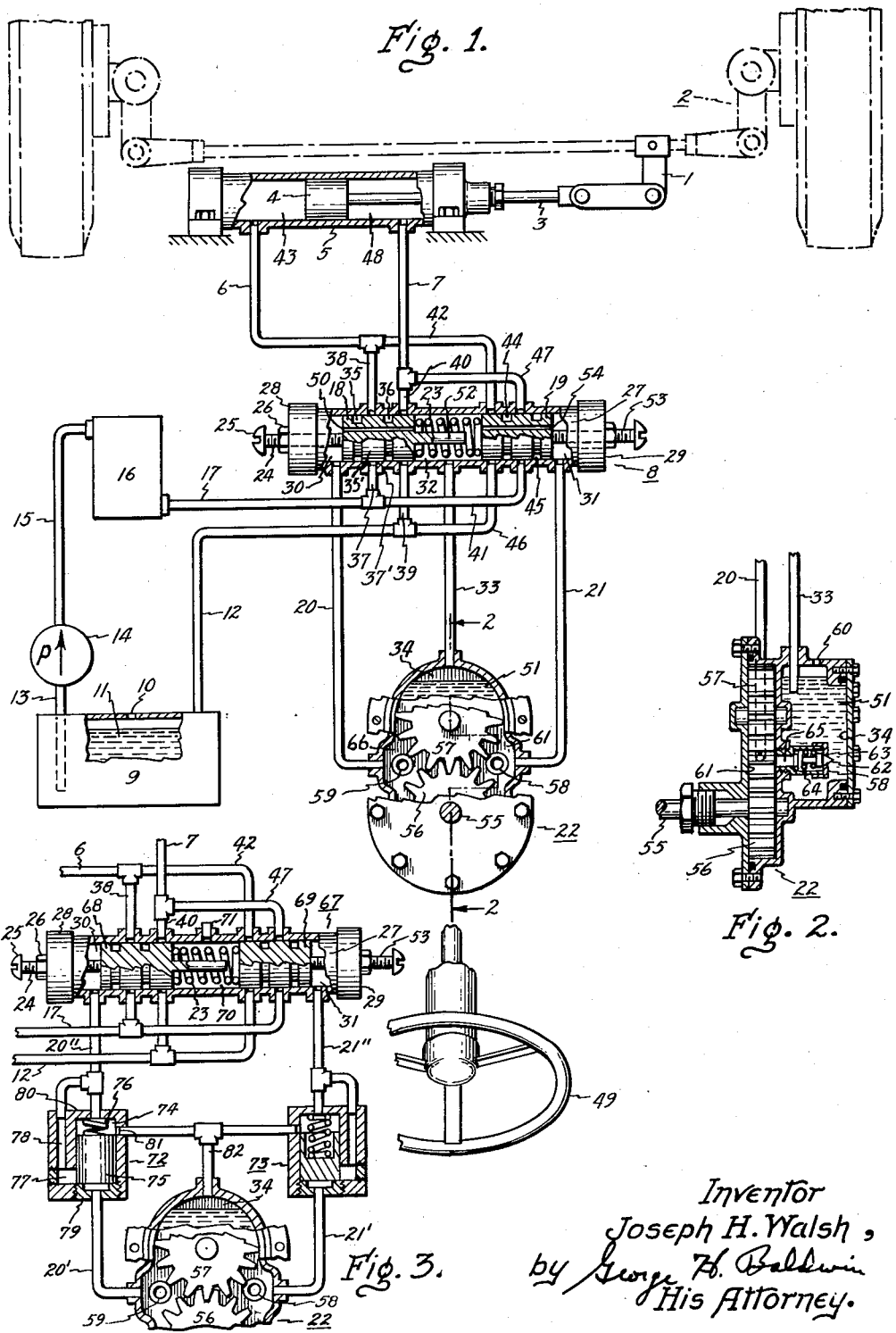
Fig. 1 is a schematic diagram, in plan, of a hydraulic steering system incorporating the invention.
Fig. 2 is a sectional side elevation of a steering wheel actuated pump and associated reservoir which forms a portion of the system of Fig. 1.
Fig. 3 is a schematic diagram showing a portion of a modified system.

Referring to Fig. 1 of the drawing, force may be applied to the steering arm 1, connected to and in control of the steerable vehicle wheel assembly generally indicated at 2, by piston rod 3, the rod being connected to motor piston 4 within hydraulic motor cylinder 5. Hydraulic conduits or lines 6 and 7 are arranged to supply hydraulic fluid under pressure to one or the other side of piston 4 under the control of valve 8. The arrangement is such that when fluid is introduced under pressure through line 6 to one side of piston 4, fluid may freely return through line 7, the reverse taking place when fluid is supplied under pressure through line 7.

An atmospheric or low pressure reservoir or sump 9, which may comprise an atmospheric vent 10, and in which a body of hydraulic fluid 11 is contained, is arranged to receive return flow through line 12 and to supply fluid through line 13 to pressure pump 14. Pump 14 is connected through line 15 to pressure tank 16 and operates to maintain an appropriate quantity of hydraulic fluid under positive pressure in tank 16. The pressure in tank 16 may be of the order of 50 to 200 lbs. per square inch, or may be such different pressure as may be appropriate to the size and desired force to be provided by piston 4.

The supply of pressure fluid from source 16 through line 17 is controlled by valve element plungers or spools 18 and 19 of valve 8, and the plungers are actuated by hydraulic fluid supplied through lines 20 and 21 from a gear pump generally referred to by the numeral 22. In the rest condition, a compression spring 23 disposed between spools 18 and 19 retains spool 18 in its maximum lefthand position against an adjustable stop, such as bolt 24, of which a head 25 and lock nut 26 permit setting of the stop position. The barrel 27 of valve 8 has ends closed by caps 28 and 29 and a closed expansible end chamber 30 is thus formed to the left of spool 18 and an expansible closed end chamber 31 is similarly formed to the right of spool 19. End chamber 30 is in free communication with line 20, while end chamber 31 is in communication with line 21. Chamber 32, which exists between the inner ends of the valve spools, is in free communication through line 33 with an atmospheric or low pressure sump 34 associated with pump 22.

Spool 18 comprises valve passages or recesses 35 and 36 which, upon displacement of the spool toward the right, may respectively align between lines 37 and 38 and between lines 39 and 40. Line 37, together with line 41 which is manifolded therewith, connects through line 17 to pressure source 16, while line 38 and line 42 which is manifolded therewith connect directly with power piston line 6 and, therethrough, to the lefthand chamber 43 of motor 5. Similarly, spool 19 comprises passages or recesses 44 and 45 which, upon displacement of spool 19 toward the left, align between return line 46 and power piston line 42, and between pressure line 41 and power piston line 47, respectively. Line 46 connects directly with return line 12, being manifolded with line 39, while line 47 is manifolded with line 40 and connects directly through line 7 to the right hand chamber 48 of power cylinder 5. It will be apparent that the several hydraulic lines terminate in respective ports, such as port 37′, opening into the interior cylindrical chamber of the valve body and that the ports are appropriately spaced along the chamber side walls to be closed and opened, respectively, by the respective lands, such as land 35′, and recesses, such as recess 35 of the slideably movable valve elements 18 and 19.

As hereafter explained, pump 22 may be operated by the steering wheel 49 to force hydraulic fluid through line 20 into end chamber 30. This operation of the steering wheel causes element 18 to move toward the right until pressure fluid passes from source 16 through lines 17 and 37 into groove 35 and thence through lines 38 and 6 into chamber 43 of cylinder 5. The pressure thus supplied from source 16 moves piston 4 toward the right, and this movement of the piston causes fluid in chamber 48 to pass through lines 7 and 40 and through groove 36 into lines 39 and 12 and back into the body of fluid 11 in sump 9. As long as pressure is maintained in chamber 30, spool 18 will be displaced away from stop 24 against the pressure of spring 23. A bypass channel or passageway 50 extends longitudinally through spool 18, however, and when the supply of fluid through line 20 ceases, fluid passes from chamber 30 through restricted passage 50 and enters central chamber 32, from which the fluid flows through line 33 back into atmospheric reservoir 34 to rejoin the fluid 51 contained therein. Thus, if wheel 49 is turned in the direction to supply fluid to chamber 43 of cylinder 5, piston 4 continues to move toward the right as long as the steering wheel is in motion, but piston 4 locks in position within a very short time after rotation of the steering wheel ceases, such as within a second or less, since bypass channel 50 is sufficiently large to permit rapid return of spool 18 under the influence of spring 23 when the supply of fluid through line 20 ceases. In a practical embodiment, passageway 50 may have a diameter of about ⅛ to ¼ inch, while line 20 may have a diameter of two or three or more times the diameter of the bypass passageway.

Since channel 36 aligns between lines 40 and 39 in response to the displacement of the spool necessary to align channel 35 between lines 37 and 38, fluid passes from the chamber 48 into sump or reservoir 9 with rightward movement of piston 4.

With both spools 18 and 19 in the neutral or rest position, as shown in Fig. 1, all communication through the valve to the motor is shut off and no fluid can enter or leave either chamber 43 or 48 of cylinder 5, whereby piston 4 remains stationary therein.

A stop member in the form of a rod or dowel 52 extends from spool 18 toward spool 19 within chamber 32, and the rod 52 is proportioned in length to permit spool 18 to move toward the right only a sufficient distance to align recess 35 with lines 37 and 38 and to align recess 36 with lines 39 and 40. Rod 52 similarly limits the leftward motion of spool 19 to the position in which channels 44 and 45 are aligned with lines 42 and 46 and lines 41 and 47, respectively. It is believed apparent that spool 19 will respond by leftward movement, away from its rest position against stop bolt 53, when fluid is supplied through line 21 from pump 22, that such leftward movement will be against the force of spring 23 and will be limited by contact between spool 19 and rod 52 at the point at which pressure fluid is introduced from source 16 through recess 45 into chamber 48 of cylinder 5, and while, at the same time, fluid may return through line 6 and recess 44 into return manifold line 46. As the supply of fluid through line 21 ceases, fluid passing through restricted bypass 54, and entering chamber 32 for return to reservoir 34, permits spool 19 to be returned to stop 53 by spring 23. Spring 23 may, if properly proportioned, serve not only as biasing means to urge the valve elements outwardly but also as stop means to establish the minimum separation distance between the inner ends of the valve elements. Thus, if spring 23 becomes completely compressed as element 18 is moved into full open position, with its recess aligned between the ports controlled thereby, dowel stop member 52 may be eliminated.

Pump 22 comprises a gear pump operated by shaft 55, to which steering wheel 49 is connected. Meshing gears 56 and 57 operate in response to rotation of shaft 55, to which gear 56 is connected, to pump fluid 51 from reservoir 34 through a check valve 58 and into line 20 or through check valve 59 into line 21 in accord with the direction of rotation of shaft 55. The operation and construction of pump 22 and its associated reservoir 34 is better understood with reference to Fig. 2 wherein return line 33 is seen to connect with the reservoir 34 terminating preferably below the level of liquid 51 therein. Atmospheric vent 60 is provided in the reservoir and fluid 51 may enter gear chamber 61 through check valve 58 in response to appropriate rotation of shaft 55 and resultant rotation of gears 56 and 57. Check valve 58 may comprise a movable member 62 held against apertured seat 63 by spring 64, and upon appropriate rotation of the gears fluid is admitted through channel 65 in response to a reduction in pressure sufficient to lift valve member 62 from its seat against the weak force of spring 64.

It will be understood that rotation of gear 56 in a counterclockwise direction, as seen in Fig. 1, will result in a reduction in pressure in line 20 and an increase in positive pressure in line 21, fluid entering the pump chamber 66 through a check valve 59 from sump or reservoir 34 and being forced into line 21, and such increase in pressure in line 21 forces plunger or valve element 19 toward the left against the bias of spring 23. Dowel or rod 52, or, in the absence of dowel 52, the completely compressed spring itself, limits the travel of valve element 19 to a displaced position in which the grooves 44 and 45 align with the ports of lines 42 and 46 and with the ports of lines 41 and 47, respectively. Bypass channel 54 permits fluid to leak from chamber 31 into chamber 32 and such leakage permits wheel 49 to continue rotation to supply fluid to chamber 31 and, upon stopping of wheel 49, permits return of valve element 19 to its valve closed position against stop 53 under the influence of spring 23. Thus, as long as wheel 49 is being rotated in one or the other direction, motor element 3 continues to move in a corresponding respective direction; as the wheel stops, element 3 stops and remains locked in position since no fluid can enter or leave either of chambers 43 and 48.

The modified system as shown in Fig. 3 comprises a pressure fluid control valve 67 in all respects identical with the valve 8 with the exceptions that the valve spools or plunger elements 68 and 69 have no bypass channels therethrough, and that the central chamber 70 between elements 68 and 69 is merely vented to the atmosphere through a vent 71 rather than having a return to the gear pump reservoir 34.

Shown in Fig. 3 is only a portion of the complete steering system of which the portions not shown are identical to portions shown in Fig. 1. Thus in Fig. 3 each of hydraulic lines 6, 7, 38, 40, 42 and 47 are identically arranged and cooperate with a motor or double acting hydraulic cylinder and piston in the manner shown in Fig. 1. Line 17 connects with a source of pressure fluid and line 12 serves to return fluid as in Fig. 1, while reversible gear pump 22 is arranged with fluid reservoir 34 as shown and described in connection with Fig. 1. In other respects, parts of Fig. 3 correspond identically in structure and function with similarly identified parts of the system of Fig. 1 except in the following specifically described respects.

Lines 20' and 21', corresponding generally to lines 20 and 21 of Fig. 1, from time-to-time alternatively and selectively receive pressure fluid in accord with operation of pump 22, and the fluid thus supplied passes through poppet check valve elements 72 or 73, respectively, and through the appropriate line 20" or 21" into end chamber 30 or 31, thereby to force the respective valve element 68 or 69 from closed rest position into displaced valve open position.

Poppet check valve 72 comprises a closed cylindrical chamber 74 in which a valve plunger 75 is disposed in a sliding fit. Compression spring 76 is arranged to bias plunger 75 downwardly into covering relation with port 77 connecting through conduit 78 with line 20". Line 20' from pump 22 enters through the lower wall 79 of chamber 74 and supplies fluid under pressure under plunger 75 in response to appropriate operation of the pump. Line 20" connects through the top cylinder wall 80 with the upper interior of the cylinder. A port 81 enters into the cylinder above the upper end of the plunger. The distance between ports 81 and 77 measured between their lower edges is preferably equal to the height of plunger 75, while the port 77 is slightly larger, vertically, than port 81. Pressure fluid through line 20' causes plunger 75 to rise and to start opening port 77 as closing of port 81 is started. Fluid flows through passage 78 into line 20", into chamber 30 and into the upper end of chamber 74. So long as the pressure in line 20' exceeds the pressure in chamber 30 by an amount greater than the force of spring 76, fluid flows into the chamber 30 causing valve element 68 to move away from its stop 24. As soon as the pressure difference between line 20' and chamber 30 decreases to less than the pressure exerted by spring 76, however, plunger 75 moves downwardly under the influence of spring 76 uncovering port 81 and permitting fluid to bypass through line 82 back into reservoir 34. Assuming pump 22 to be not operating, and plunger 75 to be raised against spring 76, fluid passes out through port 77 and passage 78 into line 20" and thence into the space above plunger 75 permitting plunger 75 to drop and thereby to open bleeder or bypass port 81. Such action permits the rapid return of plunger 68 to its stop 24. The provision of poppet check valve 72, accordingly, operates to close off the bypass channel between chamber 30 and reservoir 34 during the time of operation of the wheel and pump 22 in the direction to open the ports associated with plunger 68 and thereby to cause the controlled motor, such as motor 5 of Fig. 1, to operate in one direction, and it will be readily understood that motor operation in the other direction is similarly attained in that poppet bypass valve 73 is identical to valve 72 and operates with its respective lines 21', 21" and 82 in the same manner as valve 72, although, of course, in connection with rotation of pump 22 in the opposite direction to supply pressure fluid in line 21'.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. A hydraulic control system for a double acting hydraulic motor having two fluid inlets, said system comprising a reversible pump having two outlets operable to provide pressure fluid selectively to one or the other said outlet, a hydraulic valve having two individually slideable plungers therein, a compression spring between said plungers biasing said plungers apart, stop means engageable by said plungers and determining respective predetermined outward valve-closing limit positions for said plungers, respective chamber means outwardly of each said plunger, each said chamber means being connected to a respective said pump outlet and operative to displace the respective said plunger inwardly against said spring in response to the supplying of pressure fluid thereto from a respective said outlet, said valve having respective pairs of ports, each said pair of ports being closed by a respective said plunger in its said valve-closing position and opened into intercommunication upon inward motion of the plunger, each said pair of ports being interposed between said pressure source and a respective one of said motor inlets.

2. Control mechanism for controlling the supply of pressure fluid from a pressure fluid source to a reversible hydraulic motor, said mechanism comprising a main control valve having two spaced valve elements separated by a compression spring and a closed valve chamber in which said elements are slideably disposed, said chamber comprising respective opposite closed end chamber portions extending outwardly of each said element, a sump, reversible pump means having a pair of pressure outlets and selectively operable to supply pressure fluid from said sump selectively to one or the other said outlet, each said outlet being connected to a respective said end chamber portion, and a restricted bypass passageway connecting each said end chamber portion with said sump, said motor having two pressure fluid inlets, said main valve having a port interposed between one said inlet and said source and a second port interposed between the other said inlet and said source, each of said ports being located for control by a respective one of said valve elements.

3. In a hydraulic power system comprising a source of pressure fluid and hydraulic motor means selectively operable in accord with supply of pressure fluid to one or another motor lines, a control system comprising main control valve means having two movable valve elements and respective port means operatively associated with each said element for control thereby, said port means comprising a first port associated with one said element and connected in series between said source and said one motor line and a second port associated with the other said element and connected in series between said source and said other motor line, stop means for each said element, spring means operatively connected to said elements and urging each said element into a respective predetermined position against its respective said stop means, said first port being positioned to be closed by said one element in its said predetermined position and said second port being positioned to be closed by said other element in its said predetermined position, a respective hydraulic chamber associated with each said element and each said chamber operative in response to the introduction of pressure fluid thereinto to force the respective said element from its said predetermined position against said spring into a displaced position in which its said associated port is opened, thereby to admit pressure fluid from said source through said port into a respective said motor line, and a reversible pump having two outlets individually and respectively connected to said chambers selectively operable to supply hydraulic pressure fluid alternatively to one or the other said chamber.

4. The control system of claim 3 wherein a low pressure sump is connected to supply fluid to said pump and wherein restricted bypass passageway means interconnect said sump with each of said chambers.

5. The control system of claim 4 wherein said restricted bypass passageway means comprises a control valve having a chamber connected to at least one of said pump outlets and having a pressure responsive valve plunger in said chamber operative in response to increased pressure in said chamber to close communication through said passageway between said sump and at least one said chamber.

6. The control system of claim 4 wherein said bypass passageway means comprises a respective opening extending through each said valve element from a portion exposed to pressure in the respective said chamber.

7. In combination, a source of pressure fluid, a control valve connected to said source and having two outlets, said valve comprising two spaced ports, each said port being interposed in series between a respective said outlet and said source, a respective movable valve element for each said port, each said element being spring loaded into position to close the respective said port and being movable against said spring loading to open the respective said port, respective expansible chamber means for each said element and each having a movable wall connected to move the respective said element, and a reversible control pump having two outlets connected respectively to said respective chamber means, said pump being operable to supply actuating pressure fluid selectively to one or the other of said expansible chamber means.

8. The combination of claim 7 wherein each said movable wall comprises an end wall of the respective said element, wherein said valve comprises a hollow body, wherein said chamber means comprise opposite hollow end portions of said valve body, and wherein said elements are spring loaded outwardly from each other.

9. A control valve comprising a body forming a closed, elongated, hollow cylindrical interior chamber having a plurality of ports spaced along the side walls of said chamber and opening thereinto, a pair of cylindrical valve members slideable in said chamber, each said element having side wall recesses and lands for respectively opening and closing said ports, said elements having respective outer end faces facing the respective end walls of said chamber and defining a respective expansible end chamber between each said chamber end wall and the respective said element outer end face, said elements having respective inner end faces in spaced facing relation, spring and stop means comprising a compression spring, said last means being disposed between said inner end faces and biasing said elements outwardly and establishing a minimum separation between said inner end faces, stop means in said end chambers engageable by said respective outer end faces and limiting the outward motion of each said element, each said end chamber having a pressure fluid inlet opening thereinto through a stationary wall thereof, and a respective restricted fluid bypass passageway communicating with each said expansible end chamber.

10. The control valve of claim 9 wherein said bypass passageway for each said end chamber extends through the respective adjacent said valve member from its said outer to its said inner face and opens into the space between said inner faces, and wherein said body has a fluid return opening communicating through a wall of said body and opening into said interior chamber between said inner end faces of said valve members.

References Cited in the file of this patent

UNITED STATES PATENTS

| | | |
|---|---|---|
| 2,236,467 | Clench | Mar. 25, 1941 |
| 2,637,303 | Cintron | May 5, 1953 |
| 2,737,021 | Edge et al. | Mar. 6, 1956 |